United States Patent [19]

Wreede

[11] Patent Number: 4,854,674
[45] Date of Patent: * Aug. 8, 1989

[54] PROCESS FOR IMPROVING HOLOGRAPHIC EFFICIENCY

[75] Inventor: John E. Wreede, Monrovia, Calif.

[73] Assignee: Hughes Aircraft Company, Los Angeles, Calif.

[ * ] Notice: The portion of the term of this patent subsequent to Aug. 18, 2004 has been disclaimed.

[21] Appl. No.: 706,054

[22] Filed: Feb. 27, 1985

[51] Int. Cl.$^4$ .................................... G02B 5/32
[52] U.S. Cl. ........................ 350/320; 350/3.7
[58] Field of Search ............... 430/1, 2; 350/3.6, 3.61, 350/3.7, 320

[56] References Cited

U.S. PATENT DOCUMENTS 2,947,626  8/1960  Famely et al. ............... 96/34
3,012,886  12/1961  Lerner .
3,940,204  2/1976  Withrington .

FOREIGN PATENT DOCUMENTS 0043993  1/1982  European Pat. Off. .
2249364  5/1975  France .
57-19084  2/1983  Japan .
1371121  10/1974  United Kingdom .

OTHER PUBLICATIONS

Applied Physics, vol. 10, No. 1, May 1976, S. Case et al.: "Index Modulation and Spatial Harmonic Generation in Dichromated Gelatin Films", pp. 41–51.
Proceedings of the SPIE, vol. 215, "Recent Advances in Holography", 1980, Published by SPIE (Palos Verdes, California, U.S.), S. McGrew: Color Control in Dichromated Gelatin Reflection Holograms, pp. 24–31.
Optics and Laser Technology, vol. 5, No. 4, Aug. 1973; R. McPhedran: "Profile Formation in Holographic Diffraction Gratings", pp. 166–171.
Applied Optics, vol. 10, No. 3, Mar. 1971, K. Biedermann: "Attempts to Increase the Holographic Exposure Index of Photographic Materials" pp. 584–595.
Optics Communications, vol. 43, No. 2, Sept. 1982, R. Syms et al. "Noise Gratings in Photographic Emulsions", pp. 107–110.
Photographic Science and Engineering, vol. 28, No. 5, Oct. 1984 (Easton, PA, U.S.), S. Sjolinder: "Swelling of Dichromated Gelatin Film", pp. 180–184.
IEEE Journal of Quantum Electronics, vol. QE-4, No. 11, Nov. 1968; A. Mikaelian et al.; "Holograms on Photochromic Films", pp. 757–762.
Applied Optics, vol. 18, No. 14, Jul. 15, 1979, B. Chang et al.: "Dichromated Gelatin for the Fabrication of Holographic Optical Elements", pp. 2407–2417.
Nouvelle Revue d'Optique, vol. 4, No. 5, Dec. 1973; J. J. Clair et al.: "Etude Experimentale des Proprietes Optiques des Photoresines; Etude et Analyse de Phenomenes Lies a la Preexposition", pp. 353–355.

Primary Examiner—Bruce Y. Arnold
Attorney, Agent, or Firm—Leonard A. Alkov; A. W. Karambelas

[57] ABSTRACT

A layer of material having relatively low light sensitivity is interposed between a substrate and a light sensitive recording medium during recording of a slant fringe hologram. The layer frees the ends of the fringes from the substrate to permit greater expansion during a subsequent chemical swelling process, thereby resulting in a slant fringe hologram having improved efficiency. In one embodiment, a separate layer of light insensitive material is applied to the substrate prior to application of the recording medium. In another embodiment, a separate layer of light sensitive material is applied to the substrate and is then desensitized by exposure to incoherent light or by heat treatment prior to application of the recording medium.

12 Claims, 2 Drawing Sheets

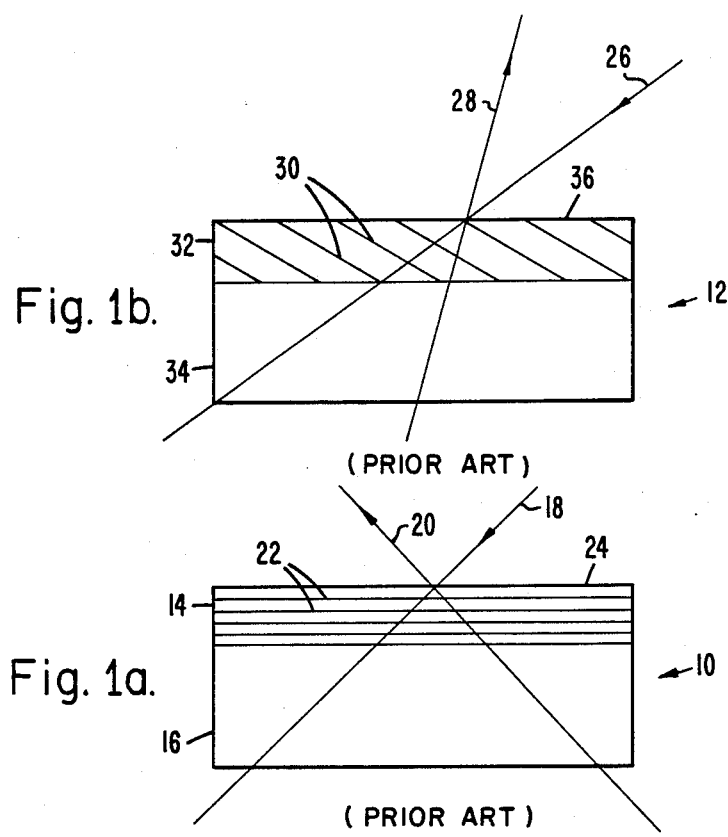
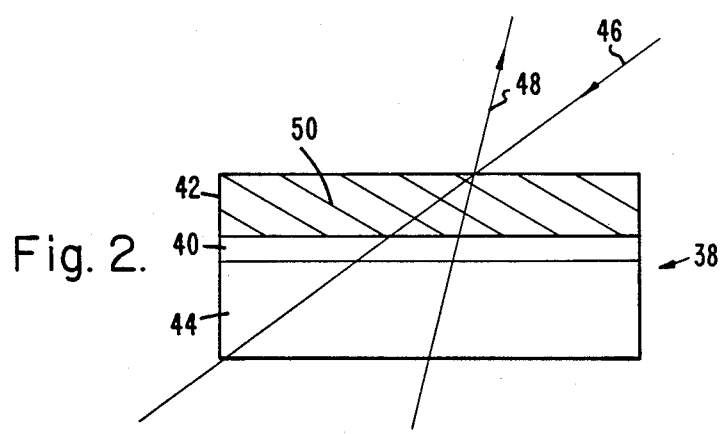

PROCESS FOR IMPROVING HOLOGRAPHIC EFFICIENCY

BACKGROUND OF THE INVENTION

The Government has rights in this invention pursuant to Contract No. N62269-81-C-b 0220 awarded by the Department of the Navy.

This invention relates generally to holography and more particularly has reference to a method for making slant fringe holograms having increased efficiency.

A hologram is a diffraction optical element which generally consists of a thin layer of photoreactive gelatin (e.g., dichromated gelatin) typically mounted on a glass substrate. The gelatin is exposed to intersecting laser beams which set up an interference pattern. That pattern is recorded in the gelatin as a sinusoidal modulation in the index of refraction. A pattern of holographic fringes corresponding to the refractive index modulation defines the hologram. After the fringes are recorded, the gelatin is subjected to a chemical swelling procedure which amplifies the refractive index modulation to increase the diffraction efficiency of the hologram.

A hologram acts as a wavelength and direction sensitive optical filter. Incident light within a predetermined range of wavelengths and directions will be diffracted by the hologram into a predetermined pattern and direction. For light significantly outside those wavelengths or directions, the hologram will act as a transparent piece of glass.

Holograms have many uses.

In modern aircraft, both military and commercial, a hologram is used in the combiner element of the head-up display. A head-up display provides relevant symbology, such as flight data and weapons aiming information, superimposed on the pilot's forward field of view. The symbology is generated on a cathode ray tube and projected through a relay lens to a transparent combiner element located between the pilot's eyes and the aircraft windscreen. The combiner includes a holographic film which diffracts the projected symbology to the pilot's eyes while simultaneously affording him an unobstructed view through the combiner to the outside world. See, U.S. Pat. No. 3,940,204 to Roger J. Withrington.

Holograms are also used in visors designed to protect eyes from damaging light exposure, such as might be encountered from an incoming laser beam. A holographic element in the visor diffracts and redirects incoming laser light out of the wearer's field of vision. By suitable control of the light used to generate the hologram (angles, wavelengths, etc.), the degree of reflectivity/transmissivity of the hologram can be selectively determined and a cone of total reflection for a given wavelength can be provided to protect the wearer's eyes from damaging incident light. It is essential that the hologram be nearly 100% efficient in diffracting the damaging light so that it does not reach the eye. With an extremely intense beam, such as a laser beam, inefficiently diffracted light may enter the cone of protection and be sufficient to damage the wearer's eyes.

It is usually desirable to construct a hologram with zero degree fringes, i.e., fringes that are parallel to the surface of the gelatin. However, in some cases, physical design restraints prevent the substrate holding the gelatin layer from being shaped in conformity with the desired fringe pattern. In those cases, the fringes intersect the surface of the gelatin to form a slant fringe pattern. One problem with slant fringe patterns is that their diffraction efficiency is inherently lower than corresponding zero degree fringe patterns. That deficiency can be extremely important when a slant fringe hologram must be used in a laser eye protection visor.

There is no previously known technique for making slant fringe holograms having the very high efficiencies obtainable in zero degree fringe holograms. Any of the known procedures for making higher efficiency zero degree fringe holograms will produce increased efficiencies when applied to slant fringe holograms. Such procedures include optimizing exposure levels, processing temperatures, processing solutions, gelatin moisture content, dichromate concentration, beam ratios, gelatin thickness and gelatin types. However, slant fringe holograms will always have a lower efficiency than corresponding zero degree fringe holograms.

It is apparent that any application where maximum diffraction efficiency (either in absolute value or in uniformity across the format) is of importance, such as laser eye protection devices, and in which optical design dictates slant fringes, would benefit from a technique which gives slant fringe holograms an efficiency approaching that of zero degree fringe holograms.

SUMMARY OF THE INVENTION

The present invention overcomes the deficiencies of the prior art by providing a technique for making slant fringe holograms having increased efficiencies approaching that of zero degree fringe holograms.

One explanation for the phenomenon of lower efficiency in slant fringe holograms is that the reacted gelatin forming the ends of the fringes is anchored to the glass substrate and does not allow sufficient expansion of the gelatin during the chemical swelling process. A dichromated gelatin hologram (15 micron thick gelatin layer) with fringes parallel to the substrate can be easily processed to an efficiency of 99.99% reflection (measured as less than 0.01% transmission). A similar gelatin film exposed such that the fringes are at an angle of 10° to the substrate will have an efficiency of only 99.9% or less (corresponding to 0.10% transmission).

In the present invention, the ends of the interference fringes are separated from the surface of the rigid substrate by coating a separate layer of light insensitive material (e.g., non-dichromated gelatin) between the substrate and the dichromated gelatin before the fringe pattern is recorded. The gelatin is thus free to expand naturally during the chemical swelling process, resulting in a hologram having increased efficiency.

In one embodiment, a separate layer of light insensitive material is applied to the substrate prior to application of the photoreactive gelatin recording medium. In another embodiment, a separate layer of light sensitive material (e.g., dichromated gelatin) is applied to the substrate and is then desensitized by exposure to incoherent light or by heat treatment prior to application of the recording medium.

Objects of the invention are, therefore, to provide an improved hologram and, more specifically, to provide a slant fringe hologram having improved diffraction efficiency.

Another object of the invention is to provide an improved method for making slant fringe holograms.

Still another object of the invention is to provide a slant fringe hologram having a diffraction efficiency sufficient for use in a laser eye protection device.

A further object of the invention is to provide an improved laser eye protection device.

Yet another object of the invention is to provide a method for making slant fringe holograms having increased efficiency comprising applying a layer of light sensitive holographic recording medium to a substrate, forming a region only between the recording medium and the substrate having substantially lower light sensitivity than said recording medium, and exposing the recording medium to coherent light to record a slant fringe pattern therein.

A further object of the invention is to provide a method for making slant fringe holograms having increased efficiency comprising applying a layer of light sensitive holographic recording medium to a substrate, forming a region between the recording medium and the substrate having substantially lower light sensitivity than said recording medium, exposing the recording medium to coherent light to record a slant fringe pattern therein, and swelling the recording medium.

A still further object of the invention is to provide a slant fringe hologram having increased efficiency comprising a substrate, a layer of holographic recording medium mounted on said substrate, said layer having a slant fringe pattern recorded therein, the fringe pattern at only surface regions of the medium adjacent the substrate being substantially reduced in contrast from the fringe pattern in the interior of the holographic medium.

These and other and further objects and features of the invention are apparent in the disclosure which includes the above and below specification and claims and drawings.

BRIEF DESCRIPTION OF THE DRAWINGS

FIGS. 1a and 1b are, respectively, a cross-sectional schematic representation of a hologram having zero degree fringes and a cross-sectional schematic representation of a slant fringe hologram.

FIG. 2 is a cross-sectional schematic representation of a slant fringe hologram of the present invention.

DESCRIPTION OF THE PREFERRED EMBODIMENTS

Figure 3:
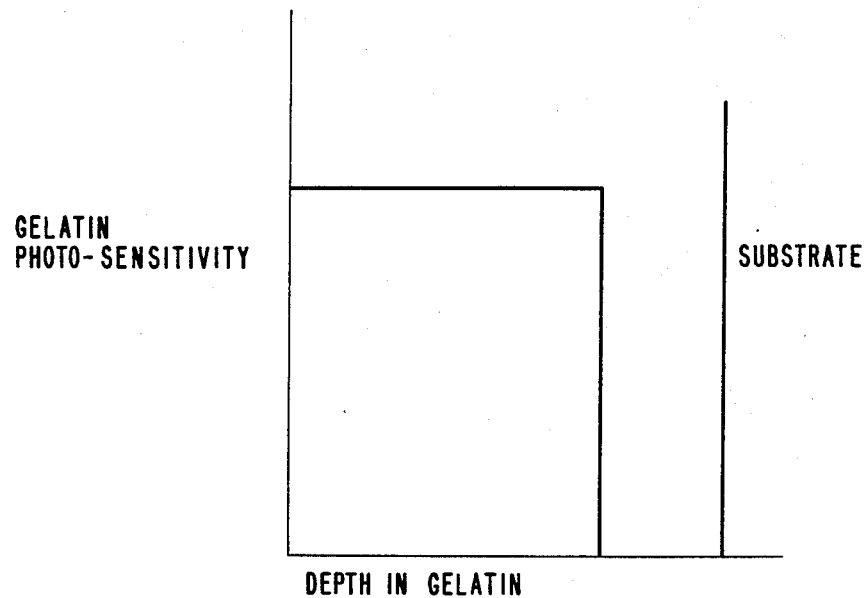
FIG. 3 is a graphical representation of the sensitivity profile of the structure shown in FIG. 2.

Referring to FIGS. 1a and 1b, a conventional zero degree fringe hologram and a conventional slant hologram are generally indicated by the numerals 10 and 12 respectively.

The zero degree fringe hologram 10 includes a layer of photoreactive gelatin 14, typically dichromated gelatin (usually 0.020M ammonium dichromate—8% gelatin; approximately 6-15 microns thick in a head-up display or 15-25 microns thick in a laser eye protection device), applied to the surface of a rigid substrate 16, typically glass. Intersecting beams 18 and 20 of coherent light, such as laser light (typically at 5145 Angstroms for dichromated gelatin), pass through the gelatin 14 to set up an interference pattern therein. The light reacts with the gelatin 14, differentially exposing the gelatin in a manner dictated by the interference pattern. Exposed gelatin is crosslinked and becomes harder than unexposed gelatin, causing the gelatin layer 14 to have a refractive index which varies or modulates throughout its volume. The areas of maximum refractive index define a pattern of fringes 22 which characterize the nature and function of the hologram.

The fringes 22 are called zero degree fringes because they are parallel to the surface 24 of the gelatin layer 14. The orientation of the fringes 22 is determined by the angular relationship between the gelatin surface 24 and the construction beams 18 and 20. Zero degree fringes are formed when the construction beams have equal angles of incidence.

The slant fringe hologram 12 is generally similar to the zero degree fringe hologram described above in that intersecting construction beams 26 and 28 of coherent light record a pattern of fringes 30 in a layer of photoreactive gelatin 32 applied to the surface of a rigid substrate 34. However, the construction beams 26 and 28 have different angles of incidence and thus produce slanted fringes which intersect the gelatin surface 36.

In simple terms, the fringe pattern recorded in a hologram contains all the information needed to reproduce the construction beams. A hologram exposed to a beam of light corresponding to one of the construction beams will recreate and produce a second beam of light corresponding to the other of the construction beams. When exposed to a beam of light having a wavelength or direction significantly different from either of the construction beams, the hologram will act as a transparent piece of glass. Hence, a hologram can be used as a wavelength and direction sensitive optical filter.

The holograms 10 and 12 shown in FIGS. 1a and 1b are called reflection holograms because the construction beams 18, 20 and 26, 28 travel in opposite directions. If the construction beams had been traveling in the same direction, a transmission hologram would have been produced. The principles of the present invention are equally applicable to transmission and reflection holograms.

In making holograms, the gelatin is first exposed to coherent light in the manner described above and is then subjected to a number of processing steps which are well known in the art. During processing, the gelatin is swollen in a water solution and is then rapidly dehydrated with isopropyl alcohol. Hardened exposed gelatin swells less than soft unexposed gelatin, thus amplifying the difference in refractive index. The diffraction efficiency of the hologram is directly related to the amplitude of the refractive index modulation. Diffraction efficiency is a measure of the effectiveness of the hologram as an optical filter.

It is well known that slant fringe holograms have inherently lower efficiency than zero degree fringe holograms. One possible explanation for the loss of efficiency in slant fringe holograms is that the exposed hardened gelatin abutting the substrate becomes firmly attached to the substrate during exposure, thus inhibiting the swelling of the gelatin during the chemical processing steps. The present invention isolates the hardened exposed gelatin from the substrate by interposing a softer material during recording, thus allowing the gelatin to swell freely during subsequent chemical processing. The result is a slant fringe hologram having increased diffraction efficiency.

The slant fringe hologram of the present invention is generally indicated by the numeral 38 and is shown in FIG. 2.

A layer 40 of non-photoreactive material or material having relatively low light sensitivity, such as non-dichromated gelatin, is interposed between the layer of photoreactive gelatin 42 and the rigid substrate 44. Construction beams 46 and 48 record a slant fringe pattern 50 in the photoreactive gelatin 42 in the manner described above. Nothing is recorded in the non-photoreactive inter-layer 40. The inter-layer 40 thus remains soft and serves to isolate the ends of the fringe pattern 50 from the rigid substrate 44. The recorded gelatin 42 then swells freely when subjected to the conventional chemical processing steps described above.

FIG. 3 shows the photosensitivity profile for the structure used to make the hologram 38 of the present invention. The sensitivity level is high throughout the photoreactive gelatin layer 42. The sensitivity level drops sharply to zero at the interface between the photoreactive layer 42 and the non-photoreactive inter-layer 40. It remains at zero through the inter-layer 40 to the interface with the substrate 44.

A conventional slant fringe hologram having a 10° slant angle has been shown to have a maximum efficiency of about 99.97%. Slant fringe holograms made in accordance with the present invention on similar samples have achieved efficiencies as high as 99.997%. Results have shown an average improvement of about 1.0 absorbance units.

Tests were conducted to determine whether the increased efficiencies achieved by the present invention could be achieved by forming conventional slant fringe holograms with thicker gelatin layers having lower dichromate concentration. The purpose of the tests was to determine whether the increased efficiency achieved by the present invention was due to a mere mixing of the photoreactive layer 42 and the non-photoreactive layer 40. The test samples did not achieve the efficiencies of the present invention.

The increased efficiencies achieved by the present invention make the resultant holograms particularly well suited for use in laser eye protection devices where very highly efficient slant fringe holograms are needed. However, the present invention is generally applicable to all slant fringe holograms and is not limited to those used in laser eye protection devices.

The present invention contemplates a variety of methods for forming the inter-layer 40 of non-photoreactive material. The following are examples thereof which should not be construed as limiting or diminishing the scope of the invention.

In one embodiment, the hologram recording structure is formed by first applying a layer of non-photoreactive material to the surface of the substrate and then applying the layer of photoreactive material to the surface of the non-photoreactive layer. That technique minimizes processing steps and is particularly useful where both photoreactive and non-photoreactive materials are readily available. A specific example involves applying a layer of non-dichromated gelatin to a thickness of about 5 microns, drying the layer for approximately six hours at room temperature, baking the layer for 5-10 minutes at 50° C., and then applying a layer of dichromated gelatin (typically 0.020M ammonium dichromate—8% gelatin) to a thickness of about 12 microns and subjecting it to a similar drying step.

In another embodiment, a first layer of photoreactive material, such as dichromated gelatin, is applied to the surface of the substrate. That layer is then exposed to incoherent light or is heat treated to reduce the dichromate ions and render the layer insensitive to light. The desensitization hardens the layer to some extent but it remains relatively soft when compared to the hardness and rigidity of the glass substrate. Thereafter, a second layer of photoreactive material, such as dichromated gelatin, is applied to the surface of the desensitized first layer and the slant fringe hologram is then recorded in that second layer. That technique is particularly useful when non-photoreactive materials are not readily available.

Desensitizaton by exposure may be acccomplished by irradiating one or both sides of the first layer with filtered incoherent light. The wavelength of the light is selected to produce absorbance in the layer. Light intensity is selected to insure exposure throughout the depth of the layer. The incoherent light reacts with the dichromate ions, causing the gelatin to harden and become less sensitive or totally insensitive to light as a function of exposure time. A specific example of desensitizing a dichromated gelatin layer (typically 0.020M ammonium dichromate—8% gelatin; approximately 5 microns thick) involves drying the layer for about six hours at room temperature, baking it for 5-10 minutes at 50° C., and then irradiating it with about 200 millijoules of fluorescent light.

Thermal desensitization also causes the gelatin to harden and become less sensitive or totally insensitive to light. A specific example of thermally desensitizing the typical dichromated gelatin first layer described in the preceding example involves drying the layer for about six hours at room temperature and then baking it for about 20 minutes at 50° C.

Copending applications Ser. No. 684,645, entitled "Side Lobe Suppression in Hologram" by John E. Wreede and James A. Arns now U.S. Pat. No. 4,687,720, and Ser. No. 684,538, entitled "Flare Reduction in Holograms" by Mao-Jin Chern and John E. Wreede describe techniques for desensitizing dichromated gelatin for purposes different from that of the present invention.

While the invention has been described with reference to specific embodiments, the exact nature and scope of the invention is defined in the following claims.

What is claimed is:

1. Method for making slant fringe holograms having increased efficiency comprising:
   applying a layer of light sensitive holographic recording medium to a single surface of a substrate;
   forming a distinct inter-layer region only between the recording medium and said substrate surface only on the side of the recording medium adjacent to said substrate surface having substantially lower light sensitivity than said recording medium; and
   exposing the recording medium to coherent light to record a slant fringe pattern therein.

2. Method for making slant fringe holograms having increased efficiency comprising:
   applying a layer of substantially non-photosensitive material to a substrate;
   applying a layer of light sensitive holographic recording medium to a single surface of the substrate; and
   exposing the recording medium to coherent light to record a slant fringe pattern therein.

3. The method of claim 2 wherein the recording medium comprises dichromated gelatin and the non-photosensitive material comprises gelatin.

4. Method for making slant fringe holograms having increased efficiency comprising:
   applying a layer of light sensitive material to a substrate and exposing the material to incoherent light to reduce light sensitivity thereof;

applying a layer of light sensitive holographic recording medium to a single surface of the substrate; and exposing the recording medium to coherent light to record a slant fringe pattern therein.

5. Method for making slant fringe holograms having increased efficiency comprising:

applying a layer of light sensitive material to a single surface of a substrate;

heat treating said light sensitive material to reduce light sensitive thereof;

applying a layer of light sensitive holographic recording medium to said single surface of the substrate thereby forming a distinct inter-layer region only between the recording medium and said single surface of said substrate surface only on the side of the recording medium adjacent to said substrate surface having substantially lower light sensitivity than said recording medium; and exposing the recording medium to coherent light to record a slant fringe pattern therein.

6. Method for making slant fringe holograms having increased efficiency comprising:

applying a layer of light sensitive holographic recording medium to a single surface of a substrate;

forming a distinct inter-layer region between the recording medium and the substrate surface only on the side of the recording medium adjacent to said substrate surface having substantially lower light sensitivity than said recording medium;

exposing the recording medium to coherent light to record a slant fringe pattern therein; and swelling the recording medium.

7. Method for making slant fringe holograms having increased efficiency comprising:

applying a layer of substantially non-photosensitive material to a substrate;

applying a layer of light sensitive holographic recording medium to a single surface of the substrate;

exposing the recording medium to coherent light to record a slant fringe pattern therein; and swelling the recording medium.

8. The method of claim 7 wherein the recording medium comprises dichromated gelatin and the non-photosensitive material comprises gelatin.

9. Method for making slant fringe holograms having increased efficiency comprising:

applying a layer of light sensitive material to a single surface of a substrate;

exposing said material to incoherent light to reduce light sensitivity thereof;

applying a layer of light sensitive holographic recording medium to said single surface of the substrate, thereby forming a distinct inter-layer region between the recording medium and the substrate surface only on the side of the recording medium adjacent to said substrate surface having substantially lower light sensitivity than said recording medium;

exposing said recording medium to coherent light to record a slant fringe pattern therein; and swelling said recording medium.

10. Method for making slant fringe holograms having increased efficiency comprising:

applying a layer of light sensitive material to a single surface of a substrate;

heat treating said material to reduce light sensitivity of said material;

applying a layer of light sensitive holographic recording medium to said single surface of the substrate thereby forming a distinct inter-layer region between the recording medium and the substrate surface only on the side of the recording medium adjacent to said substrate surface having substantially lower light sensitivity than said recording medium;

exposing said recording medium to coherent light to record a slant fringe pattern therein; and swelling said recording medium.

11. A slant fringe hologram having increased efficiency comprising a substrate and a medium mounted on said substrate having a slant fringe pattern recorded therein, with plural layers having differing degrees of light sensitivity, the fringe pattern at only surface regions of the medium adjacent the substrate surface being isolated from the substrate.

12. The hologram of claim 11 wherein the layer adjacent the substrate is formed of substantially non-photosensitive material.

* * * * *